US007925292B2

United States Patent
Tebbit et al.

(10) Patent No.: US 7,925,292 B2
(45) Date of Patent: Apr. 12, 2011

(54) METHODS, DEVICES AND SYSTEMS RELATING TO RESELECTING CELLS IN A CELLULAR WIRELESS COMMUNICATIONS SYSTEM

(75) Inventors: Nicholas John Tebbit, Old Windsor Berkshire (GB); Simon James Walke, Basingstoke Hampshire (GB)

(73) Assignee: QUALCOMM Incorporated, San Diego, CA (US)

( * ) Notice: Subject to any disclaimer, the term of this patent is extended or adjusted under 35 U.S.C. 154(b) by 839 days.

(21) Appl. No.: 11/341,964

(22) Filed: Jan. 26, 2006

(65) Prior Publication Data

US 2007/0173255 A1      Jul. 26, 2007

(51) Int. Cl.
H04B 7/00        (2006.01)
H04W 36/00    (2009.01)
H04W 4/00      (2009.01)

(52) U.S. Cl. ........ 455/525; 455/436; 455/437; 370/331; 370/332

(58) Field of Classification Search .......... 455/436–443, 455/525; 370/331–332
See application file for complete search history.

(56) References Cited

U.S. PATENT DOCUMENTS

| | | | |
|---|---|---|---|
| 6,052,598 A | | 4/2000 | Rudrapatna et al. |
| 2002/0168980 A1* | | 11/2002 | Gwon et al. .................. 455/437 |
| 2004/0219918 A1* | | 11/2004 | Kakishima et al. ............ 455/436 |
| 2004/0219926 A1* | | 11/2004 | Kim et al. ................... 455/452.2 |

FOREIGN PATENT DOCUMENTS

| | | |
|---|---|---|
| GB | 2284321 | 5/1995 |
| GB | 2287858 | 9/1995 |
| WO | 99/59253 A2 | 11/1999 |
| WO | 0207459 | 1/2002 |
| WO | 2004/073322 A2 | 8/2004 |

OTHER PUBLICATIONS

International Search Report-PCT/US2007/061165, International Searching Authority-European Patent Office-Jun. 1, 2007.
Written Opinion-PCT/US2007/061165, International Searching Authority-European Patent Office-Jun. 1, 2007.
International Preliminary Report on Patentability-PCT/US2007/061165, International Bureau of WIPO-Geneva, Switzerland-Jul. 29, 2008.
Digital cellular telecommunications system (phase 2+); ETSI TS 145 008; Radio subsystem link control (Release 6), 3GPP TS 45.008 V6.15.0, Nov. 2005, version 6.15.0, 3GPP, pp. 1-115. XP014032951.
3rd Generation Partnership Project; Technical Specification Group GSM/EDGE Radio Access Network; Radio subsystem link control (Release 4), 3GPP TS 45.008 V4.16.0, Nov. 2004, section 6.6.2, 3GPP, Volbonne-France.

* cited by examiner

*Primary Examiner* — Kamran Afshar
*Assistant Examiner* — Kathy Wang-Hurst
(74) *Attorney, Agent, or Firm* — Kristine U. Ekwueme

(57) ABSTRACT

Signals of different cells in a cellular wireless communications system are observed during associated intervals to predict a signal behavior in future. A target cell is selected by observing over time signal characteristics of potential target cells. Thereafter a target cell is selected by using the observed characteristics to predict which potential target cell will in future satisfy certain criteria.

29 Claims, 7 Drawing Sheets

METHODS, DEVICES AND SYSTEMS RELATING TO RESELECTING CELLS IN A CELLULAR WIRELESS COMMUNICATIONS SYSTEM

BACKGROUND

1. Field

The present invention relates generally to methods, devices and systems for reselecting and then handing over a mobile communications device from a first cell to a second cell in a cellular wireless communications system. More particularly, although not exclusively, aspects and embodiments of the invention relate to criteria for selecting a second cell while a mobile station is 'camped' on, or otherwise interacting with and/or controlled by, a first cell. Particular aspects and embodiments of the present invention are well suited for use in a cellular wireless communications system which supports packet switched communications, for example according to the General Packet Radio Service (GPRS) standard, but are not limited to such an application.

2. Background

It is well known that cellular wireless communication systems generally comprise a number (often large) of radio transceivers, or base stations, that define service areas or cells. The schematic diagram in FIG. 1 of the accompanying drawings, illustrates a system 100 comprising four base stations 120 defining respective cells 110. The cells typically overlap in order to ensure continuous coverage of service in the service areas. This is desirable for many reasons, not least because cellular systems are designed specifically to accommodate users as they move around within the system. In principle, mobile communications devices 130 interact with various base stations as the devices move through the respective cells 110 of the system 100.

One of the goals of a cellular wireless communication system is to enable a mobile communications device, which will be referred to herein for convenience as a "mobile station", to remain connected to the system even when the user is moving through the system from one cell to another. Traditionally, the mobile station has been a so-called "mobile phone" or "cellular phone," although, with advances in technology, a mobile station may be any one or more of a wide range of devices from solely voice devices to solely data devices. A mobile station may be anything from a traditional radio pager or mobile phone, though faxes, personal data assistants (PDAs), and music players, to computers, or any combination of these. This list is, of course, far from exhaustive. Indeed, although the term "mobile station" is used herein, the term is also intended to encompass devices that may not be user-operated or even user-operable, for example the device could be a wireless 'data card' or the like, which is within another kind of apparatus.

Early cellular systems were circuit switched systems. That it to say, for each call the system created a circuit that reserves a channel for the user for the duration of the call. This is an inefficient use of resources, especially for bursty data. As technology has advanced, newer cellular systems have moved away from circuit switching to packet switching in which bursts of data are sent only when needed. Consequently, cellular systems have become more suitable for the transmission of data, which tends to be transmitted in bursts rather than a continuous stream.

As already mentioned each cell in a cellular system is defined and served by a base station. As a mobile station is moved from the service area defined by one cell into that defined by another, the system and the mobile station must break the connection with one base station and establish a connection with another base station whilst minimizing the connection loss between the mobile station and the system. This operation is sometimes known as a cell reselection, a handoff or a handover. For simplicity of description only herein, the term "reselection" will be used as a generic term to describe the operations involved with a mobile station or equivalent moving from operating with one base station to operating with another base station; and the reader should import an alternative term, such as "handover", "handoff" or the like, if the context so dictates. The term "camped on" is commonly used, and will be used hereinafter, to describe the base station with which, and respective cell in which, a mobile station is operating. That is, a cell reselection involves a mobile station moving from being camped on one cell to being camped on another cell.

Typically, a cell reselection can be initiated either by the mobile station or by the cellular system. How reselection is initiated can depend on factors such as the kind of cellular system, its mode of operation and on the capabilities of a mobile station. In any event, reselection is typically initiated either as a result of a service degradation, which tends to lead to increased power consumption requirements, or there being an opportunity to improve the service, which would lead to reduced power consumption requirements. Especially since many mobile stations operate from battery power, an opportunity to reduce power consumption, thereby improving power efficiency, is usually advantageous. Service degradation can result from factors such as increasing distance between a mobile station and a base station or natural or man-made obstructions such as hills or buildings respectively.

One known kind of reselection operation requires a mobile station to monitor the signaling level and suitability of cells that neighbor the cell on which the mobile station is camped, which will be referred to hereinafter as the "serving cell", and compare the monitored service levels with the signaling level and suitability of the serving cell. Then, if the signaling level and suitability of a neighboring cell is deemed by the mobile station to be better than that of the serving cell, for at least a predefined period of time (say, five seconds), the mobile station initiates a reselection to the respective neighboring cell, which becomes the new serving cell. Such an operation is described in an ETSI Technical Specification document 145 008 v4.16.0, Digital Cellular telecommunications system (phase 2+); Radio subsystem link control (3GPP TS 45.008, version 4.16.0, release 4, section 6.6.2).

SUMMARY

The present inventors have appreciated that, according to the prior art, unnecessary cell reselection operations can occur. Since cell reselection operations can consume a significant amount of power and/or result is a significant break in communications during an established voice call or other connection, the present inventors have appreciated that it would be advantageous to attempt to avoid unnecessary cell reselection operations. Aspects and embodiments of the invention are, therefore, aimed at avoiding unnecessary cell reselection operations.

According to a first aspect of the present invention, there is provided a cell reselection method for selecting a target cell in a cellular wireless communications system, the method including monitoring over time signal characteristics of cells, including at least potential target cells, and selecting a target cell by using the monitored characteristics to predict which potential target cell will in future satisfy certain criteria.

According to a second aspect of the present invention, there is provided a cellular wireless communications system comprising plural cells, including a serving cell and plural potential target cells, and a mobile station operable according to the cellular wireless communications system, the system comprising: a first process to monitor over time signal characteristics of cells, including at least potential target cells; and a second process to select a target cell by using the monitored characteristics to predict which potential target cell will in future satisfy certain criteria.

According to a third aspect of the present invention, there is provided a cellular mobile communications apparatus adapted for operation in a cellular wireless communications system, the apparatus comprising: a receiver arranged to receive signals of cells, the signals having certain characteristics; and a processor arranged to operate processes for selecting a target cell, the processes comprising: a first process to monitor over time the signal characteristics of cells, including at least potential target cells; and a second process to select a target cell by using the monitored characteristics to predict which potential target cell will in future satisfy certain criteria.

According to a fifth aspect of the present invention, there is provided a communication device in which characteristics of signals of different sources are monitored over respective time periods and a source is selected for communication when the monitored characteristic satisfies certain criteria at a time after its respective time period.

According to a sixth aspect of the present invention, there is provided a transceiver in which signals of different communications nodes in a communications network are observed during associated intervals to predict a signal behavior in future, which is used to identify at least one node suitable for subsequent communication with the transceiver.

The above and further features, aspects and embodiments of the invention are set forth with particularity in the appended claims and together with advantages thereof will become clearer from consideration of the following detailed description of embodiments of the invention given by way of example only with reference to the accompanying drawings.

DETAILED DESCRIPTION

Figure 1:
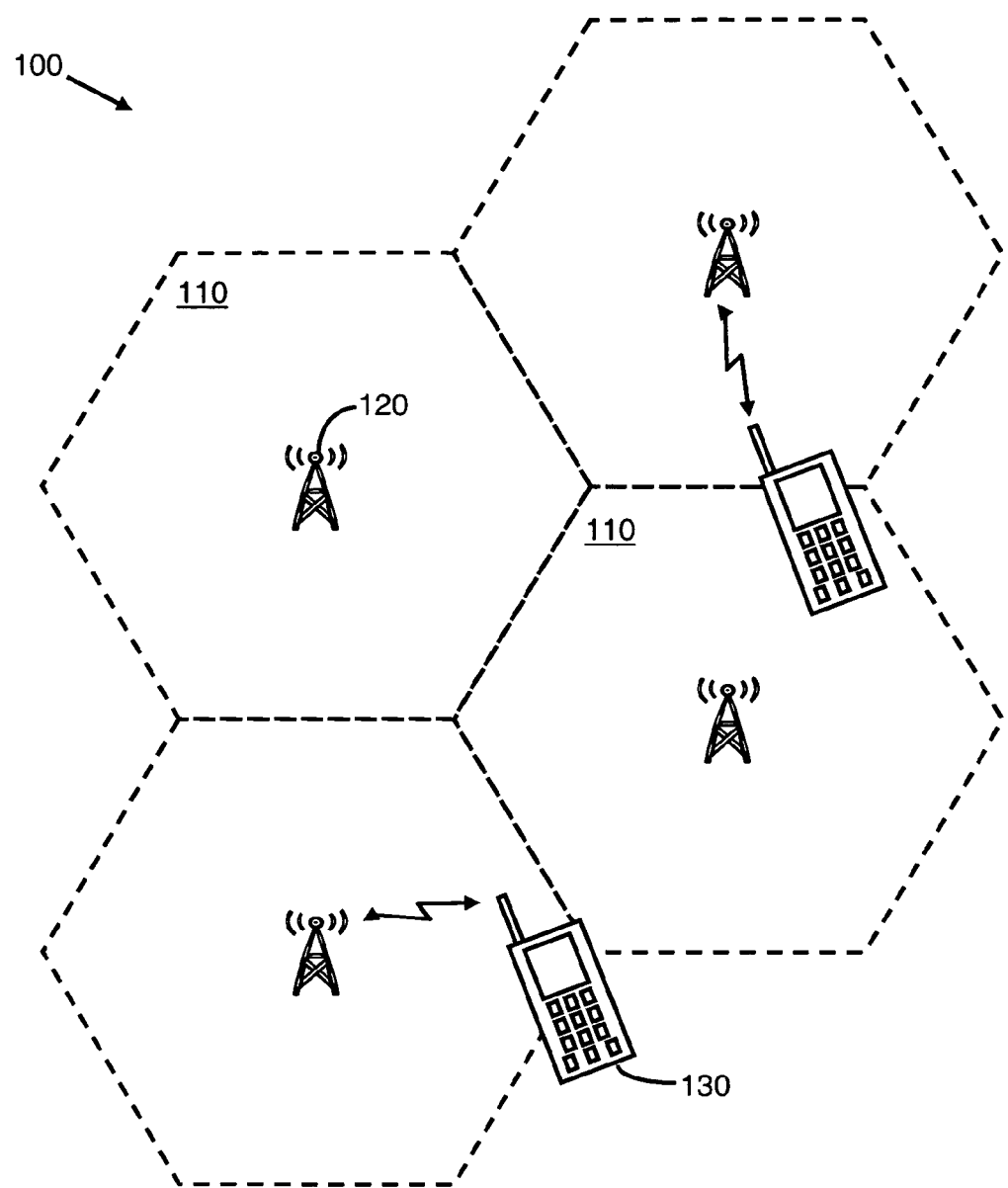
FIG. 1 is a schematic diagram showing a cellular wireless communications system.
Figure 2:
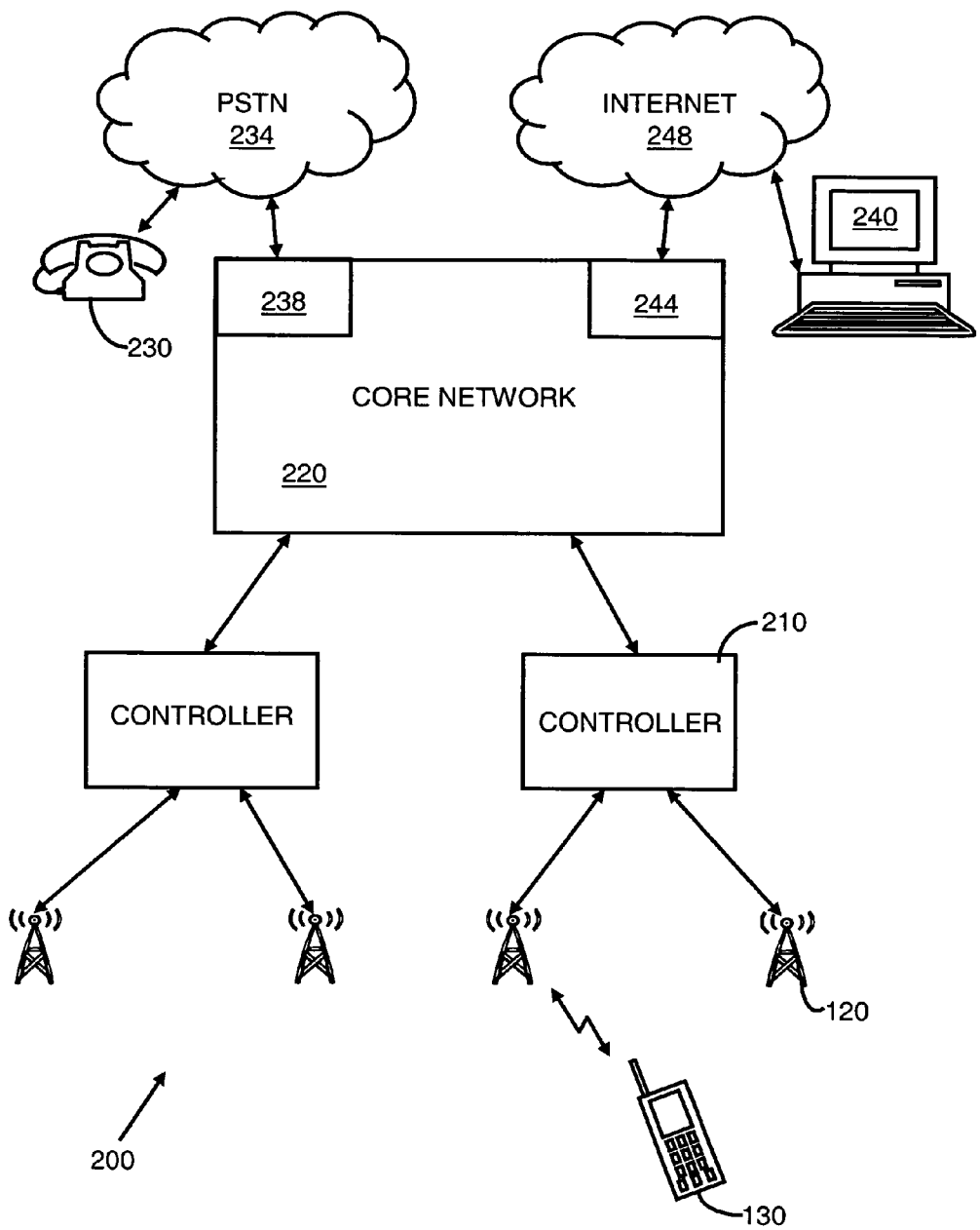
FIG. 2 is a high-level block diagram showing the main components in a cellular wireless communications system.

Turning now to the schematic diagram in FIG. 2 of the accompanying drawings, there is shown a high level block diagram of a typical wireless cellular communications system, for example as shown in FIG. 1. For the purposes of illustration, the system includes only four base stations 120, which provide access to the system for mobile stations 130, for example mobile telephone handsets. Each base station 120 is controlled by a controller 210 and each controller 210 is connected to a core network 220 of the system, via an appropriate communications infrastructure. Each controller 210 can control one base station 120 but typically a controller controls more than one base station. The core network 220 in general contains the infrastructure, components and functionality for controlling the controllers 210; routing calls and connections of all kinds from and to mobile stations 130; routing calls and connections from mobile stations 130 to other systems and terminating equipment; and receiving calls and connections, from other systems and terminating equipment, which are intended for mobile stations. Examples of other terminating equipment are traditional telephone equipment 230, which are connected to via a PSTN 234 and PSTN gateway 238 of the core network 220, Internet servers 240, which are connected to via an Internet gateway 244 and the Internet 248, and other telecommunications systems or services (not shown), such as voicemail or corporate networks respectively.

There are various kinds of wireless cellular communications systems, which operate according to various different standards. Such systems and standards include, but are not limited to, GSM, GPRS and third generation standards such as UMTS and WCDMA. The diagram in FIG. 2 is intended to be generic, and apply, at least functionally, to all such standards and systems.

Particular embodiments of the present invention relate to cell reselection in a GPRS system. According to the GPRS terminology, a base station 120 is commonly referred to as a base transceiver station (BTS) and the controller 210 is commonly referred to as a base station controller (BSC). The combination of BTS and BSC is commonly referred to as the base station subsystem (BSS). Hereafter, while GPRS components will be referred in order to describe particular embodiments of the present invention, it will be appreciated that the principles taught apply equally to other kinds of wireless cellular communications systems, such as GSM and 3G.

Figure 3:
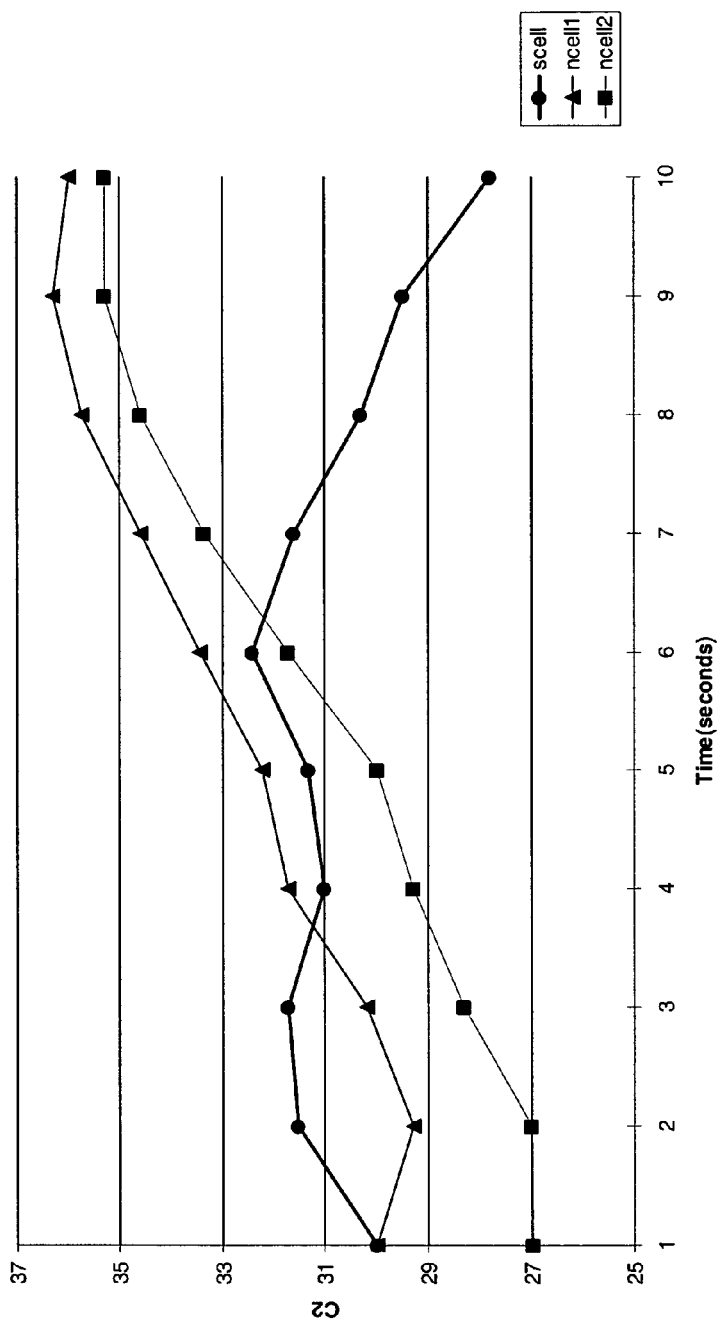
FIG. 3 is a graph showing a comparison of signaling parameter C2 levels for a serving cell and neighbor cells.

Turning now to FIG. 3, the graph therein shows three curves, which illustrate exemplary signaling relationships between a mobile station, its serving cell (scell), on which the mobile station is camped, and two neighboring cells (ncell1 and –ncell2). The signaling relationships are characterized by a signaling parameter, C2, the value of which provides an indication of the strength of signals received by the mobile station from the respective cells. In general, a higher value of C2 indicates a stronger signal between the mobile station and the cell.

It will be evident that alternative embodiments of the present invention may rely on deriving and/or monitoring different parameters and characteristics of systems and mobile stations, insofar as the parameters and characteristics relate in some way to the likely signaling performance or capability between the mobile station and a base station or similar.

In known GPRS systems, a mobile station monitors the C2 values of all cells that are classed as neighbors of the serving cell. Each cell identifies which other cells are classed neighbors and a list of neighbors is communicated to a mobile station, by a new serving cell, during or soon after a cell reselection operation. The mobile station attempts to monitor the C2 values for the serving cell and all neighbor cells during the time the device is camped on the serving cell. A mobile station generates C2 values in a pre-defined way, for example as described in section 6.4 of the aforementioned ETSI document, by evaluating various characteristics of signals received from the neighbor cells; although the most important characteristic is typically signal power. Typically, a mobile station will scan for neighbor cell signals periodically, for example every second, or as otherwise defined by a control program of the mobile station, in order to monitor the C2 levels.

Referring to the curves in the graph in FIG. 3, it is shown that the C2 value of scell fluctuates between about 30 and 33 for around six seconds and then decreases over the remaining four seconds to about 27.5. This may be as a result of the mobile station moving away from the scell BTS and towards the ncell1 BTS. At around four seconds, the C2 value for ncell1 becomes higher than the C2 value of scell. The C2 value of ncell1 increases steadily up until about nine seconds and then begins to drop. By seven seconds, the C2 value for ncell2 also becomes higher than the C2 value of scell and remains higher for the remaining period shown. However, the C2 value for ncell2 does not exceed the C2 value of ncell1. In principle, it would appear to make sense for the mobile station to select ncell1 as a new serving cell in order to improve power-efficiency. In practice, this is exactly what happens according to prior art reselection operations. Specifically, according to the prior art, as soon as the mobile station detects that the C2 value of ncell1 is higher than the C2 value of scell (which, according to the graph, is when four seconds have lapsed), the mobile station starts a timer running. Then, if, after the timer expires (for example after another five seconds), the situation remains the same, at around nine seconds, a reselection to ncell1 is initiated by the mobile station.

A cell reselection operation, by its nature, can cause a significant disruption to communications. This is at least in part because, according to the GPRS standard, as soon as a mobile station reselects to a new cell, the mobile station can spend as long as eight seconds reading broadcast information before camping onto the new cell.

The present inventors have appreciated that it can be inefficient to initiate cell reselection to the first neighbor cell that appears to have an improved C2 value. The graph in FIG. 4 includes the same C2 curves as in FIG. 3 and, in addition, a trend line is shown for each curve. The trend lines have been calculated using the C2 data and have been projected into the future, up until 15 seconds. The trend line for scell clearly shows a steady decline in C2 power. In addition, the trend lines for ncell1 and ncell2 show a steady increase in respective C2 powers. However, significantly, the trend lines provide a clear indication that the C2 power of ncell2 is likely to increase above that of ncell1 soon after nine seconds. If this turns out to be what happens in practice then a cell reselection at nine seconds, which would occur according to the prior art, from scell to ncell1, would be followed soon after (probably about 5-7 seconds later) by another cell reselection operation, from ncell1 to ncell2. In other words, the trend lines indicate that a cell reselection operation at nine seconds is unnecessary.

Figure 4:
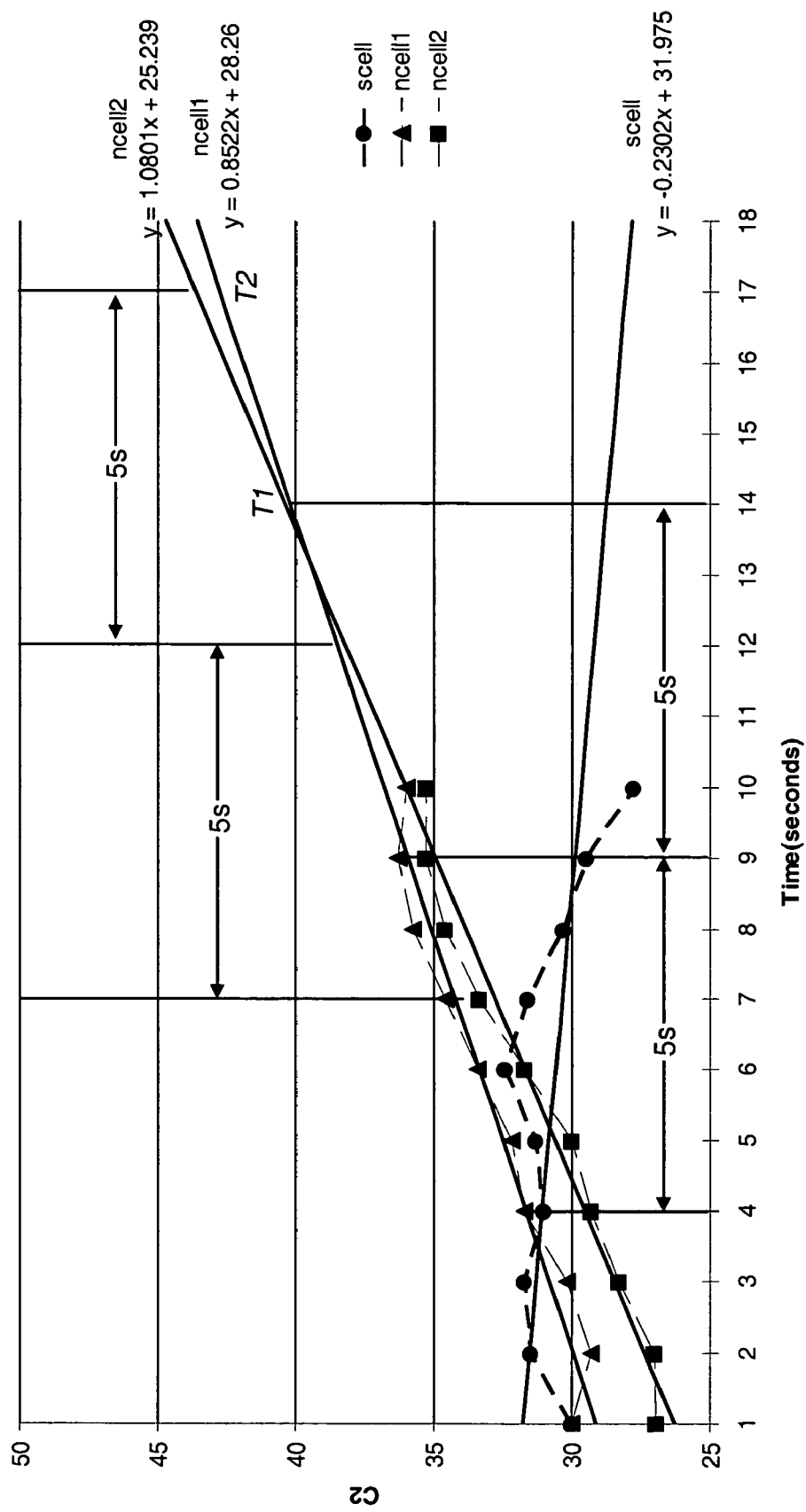
FIG. 4 is shows the same data as in FIG. 3 and includes, in addition, straight best-fit lines.

Preferred embodiments of the present invention use historic C2 data or the like, as shown in FIG. 4, to predict which neighbor cell is likely to be the best one to move to, which may not be the one that would otherwise be selected using known selection criteria.

An embodiment of the present invention will now be described in detail, wherein, in a GPRS system, a cell reselection operation uses historic C2 values to predict and then select the most appropriate neighbor cell to move to. It will, however, be appreciated that the principles are equally applicable in GPRS systems and in other kinds of wireless cellular communications systems, wherein the reselection may be initiated by the BSS (or equivalent), the core network or by a mobile station.

A cell reselection operation according to an exemplary embodiment of the present invention will now be described in more detail with reference to the flow diagram in FIG. 5. In a first step 500, a mobile station becomes camped on a new serving cell (scell) and acquires its necessary upstream signaling information and neighbor cell information from the respective BTS, in a known way. In a next step 510, the mobile station scans for signals from the serving cell and the respective neighboring cells and derives the respective C2 values. In a next step 520, the mobile station stores C2 values associated with successfully scanned signals. In this example, at least the ten most recent values of C2 are stored for each neighbor cell. Then, in step 530, the mobile station uses the stored C2 values to generate a trend of the C2 values, as will be considered in more detail below. In a next step 540, the mobile station determines whether a C2 value of any neighboring cell is better than the C2 value of the serving cell. If the result of the determination is positive for any neighboring cell (that is, the neighboring cell has a higher C2 value than the serving cell), then, in a next step 550, the mobile station starts a timer, which the mobile station associates with the respective neighbor cell. If a respective timer is already running then no additional action occurs and the timer is left running. If, on the other hand, the result of the determination is negative for any particular neighboring cell (that is, the neighboring cell has a lower C2 value than the serving cell), then, in a step 555, any respective running timer is stopped and reset. If no timer is running, then no action occurs.

In other words, according to the present exemplary embodiment, for each scan operation, a timer is started (or permitted to continue) for any neighboring cell which has a better C2 value than the source cell. A timer runs until a predetermined expiry time, unless, before or on expiry, the C2 value drops below the C2 value of the source cell, in which case the timer is stopped and reset (or otherwise cancelled). Obviously, in the example provided, a timer is not started for a neighboring cell unless its C2 becomes better than the C2 value of the source cell.

Next, in a step 560, the mobile station determines whether any timer has expired. In this example, the timers are set to expire after five seconds. In other examples, a different expiry time may be selected. In the step 560, if no timer has expired, then the process returns to the step 510, whereat the mobile station again scans for signals from the source cell and neighbor cells, and the process repeats.

If, however, in the step 560, the mobile station establishes that a timer has expired, in a step 570, the mobile station predicts future C2 values for neighbor cells, in this case five seconds in the future, and determines whether the neighbor cell having the expired timer is predicted to have the best C2 value, and hence the best signaling capability, five seconds into the future. If the result of the test is positive, then the mobile station selects that neighboring cell as a target cell and, in a step 590, initiates a reselection operation to that cell. Of course, the future time could be chosen to be more or less than five seconds.

If, on the other hand, the mobile station determines that the neighbor cell having the expired timer does not have the best predicted C2 value five seconds into the future, then, in a next step 580, the mobile station compares the predicted C2 values of all valid neighbor cells and selects, as the target cell, the neighbor cell that does have the best predicted C2 value at that future point in time. In this example, a neighbor cell is 'valid' for selection if, at step 580, it has a current C2 value higher than the C2 value of the serving cell. In this example, a neighbor cell that is valid for selection will also by definition have a timer running or also just expired. In other words, according to this criterion, a reselection operation can occur only to select a neighbor cell having a running or just expired timer.

In other examples, a criterion might be that a neighbor cell is valid for selection even if, at step 580, it does not have a C2 value higher than the serving cell C2 value. For instance, according to such examples, a neighbor cell might be selected as the target cell due to its having the fastest rising C2 value and, hence, the highest predicted C2 value at a selected future time, even if, at step 580, it does not have a current C2 value higher than the C2 value of the serving cell, and no respective timer running. Deciding which criterion to apply to which classes of neighbor cell are valid for selection is one of many system design considerations available for consideration.

In a next step 590, the mobile station initiates a reselection operation, to reselect to and camp on the selected target cell. The process then repeats from step 500.

The cell reselection operation will now be tested against the C2 level information shown in the graph in FIG. 4. In this example, both neighbor cells have a C2 value higher than the C2 value of the serving cell, so would both be valid for selection under either preceding exemplary criterion.

Figure 5:
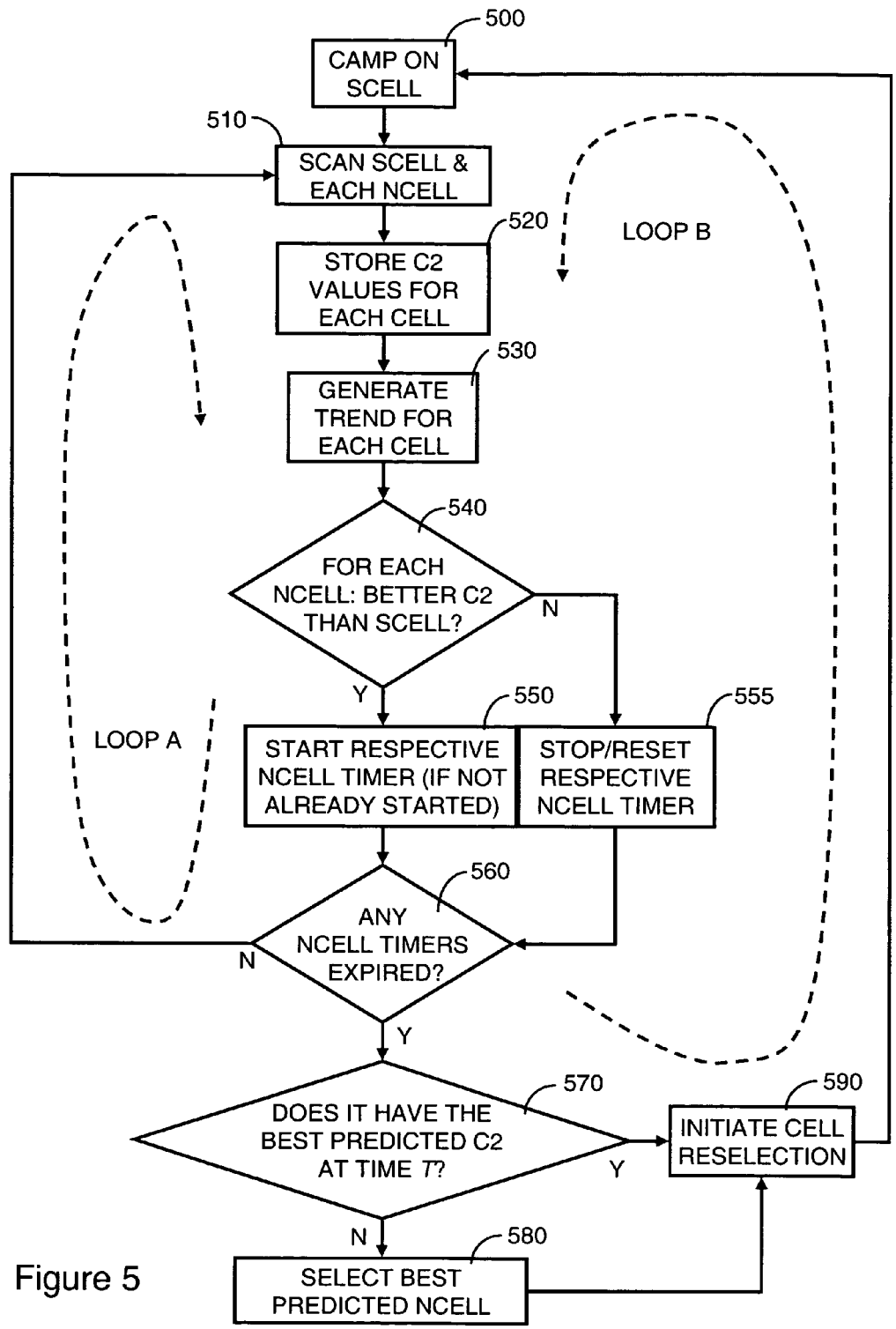
FIG. 5 is a flow chart illustrating a cell reselection operation according to one exemplary embodiment of the present invention.

As indicated in the graph in FIG. 5, the process has two main loops, wherein operation in a particular loop is dictated by the test in step 560. For example, until such time as a timer expires, the process operates in a loop A and, when a timer expires, operation moves to a loop B (for at least one iteration). With reference to the graph in FIG. 4, a first timer, which is associated with ncell1, is started, due to the test in step 540, at around four seconds, when the C2 value of ncell1 becomes higher than the C2 level of the serving cell, scell. Then, at seven seconds, the C2 level of ncell2 becomes higher than the C2 level of the serving cell, and a second timer is started. Operation of the process remains in loop A until about nine seconds, when the five-second timer associated with ncell1 expires. At nine seconds, the test in step 560 becomes positive and loop B comes into operation. In step 570, the process predicts future C2 values and finds that the C2 value for ncell1 is not predicted to be the best C2 value at time T1, at around 14 seconds on the graph, which is an additional five seconds after the timer has expired. It is apparent from the graph that, at 14 seconds, the C2 value of ncell2 is just higher than the C2 value of ncell1. This can be confirmed by substituting 14 seconds (as the y value), into the line equations shown on the graph, which gives a predicted C2 value of ncell1 as 40.2 and a predicted C2 value of ncell2 as 40.4. Additionally, it is clear from the graph that, after 14 seconds, the C2 value of ncell2 is predicted to increase at a steeper slope than the C2 value of ncell1. Thus, in step 580, the process determines that ncell2 is predicted to have the best C2 value at 14 seconds and selects ncell2 as the target cell. As a result, in step 590, the mobile station initiates reselection to ncell2, at nine seconds, while the second timer is still running.

Thus, according to the exemplary process of FIG. 5 and the data in the graph in FIG. 4, cell reselection occurs at around nine seconds, to reselect from the current serving cell to the neighboring cell ncell2. This avoids an undesirable cell reselection operation, to neighboring cell ncell1, which would otherwise occur.

A second, alternative exemplary embodiment of the present invention will now be described with reference to the flow diagram in FIG. 6. As shown, steps 500 to 560 of the graph are essentially the same as the same-numbered steps of the graph in FIG. 5, and will not be described again. However, after step 560, the process is different. In particular, when the test in step 560 becomes positive, as a result of a timer expiring, a next step 670 predicts C2 values, at a specified future time, for each neighbor cell that is associated with a running timer and for each neighbor cell that is associated with an expired timer (but not for a neighbor cell associated with a stopped or reset timer). Then, step 670 determines if any neighbor cell, for which a timer is still running, has the best predicted C2 value at the specified future time. If the result is positive, the process returns to step 510. In other words, the process holds-off from reselecting to a new serving cell while any neighbor cell, having a running timer, is predicted to have the best C2 value at the specified future time.

If, in the alternative case, step 670 determines that a neighbor cell associated with an expired timer has the best predicted C2 value at the selected future time, then, in step 680, reselection is initiated to that neighbor cell. In this example, in essence, reselection is held-off if a neighbor cell, for which a timer is still running after another timer has expired, is projected to have the best C2 value at the future time.

As with the first exemplary embodiment, neighbor cells may be valid for selection according to different criteria. For example, a neighbor cell may be valid for selection only if its respective C2 value, at step 670, is higher than the C2 value of the serving cell. Alternatively, a neighbor cell may be deemed valid for selection irrespective of the respective C2 level at step 670. In the latter case, all neighbor cells would be potential candidates for reselection on the basis of projected future C2 level.

A cell reselection operation according to the second exemplary embodiment will now be tested against the C2 level information shown in the graph in FIG. 4. As before, both neighbor cells have a C2 value higher than the C2 value of the serving cell, so would both be valid for selection under either preceding exemplary criterion.

Figure 6:
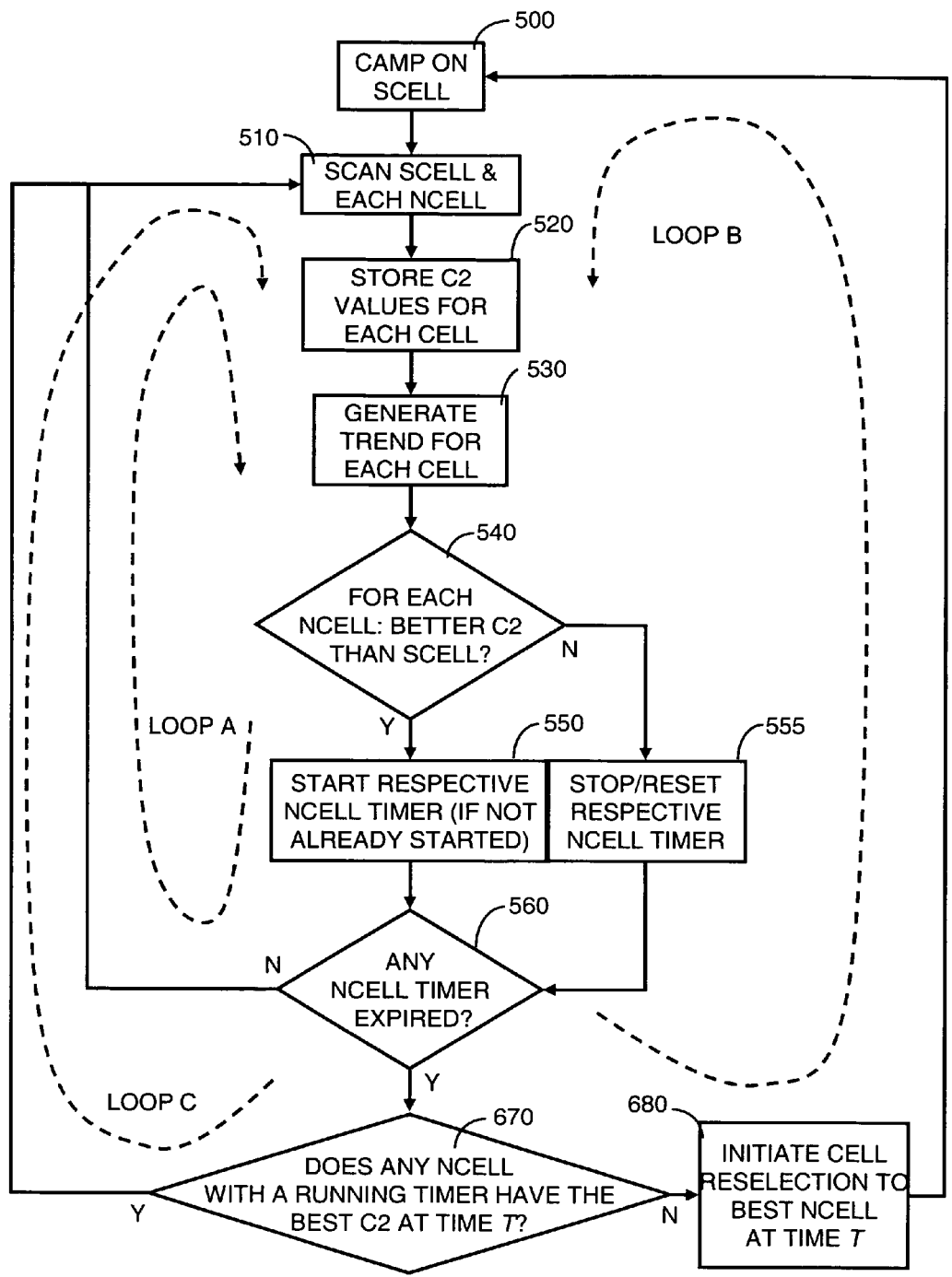
FIG. 6 is a flow chart illustrating a cell reselection operation according to a second exemplary embodiment of the present invention.

As indicated in the graph in FIG. 6, the process has three main loops, wherein operation in a particular loop is dictated by the test in step 560 and the test in step 670. For example, until such time as a timer expires, the process operates in a loop A and, when a timer expires, operation moves to a loop B or a loop C. With reference to the graph in FIG. 4, a first timer, which is associated with ncell1, is started, due to the test in step 540, at around four seconds, when the C2 value of ncell1 becomes higher than the C2 level of the serving cell, scell. Then, at seven seconds, the C2 level of ncell2 becomes higher than the C2 level of the serving cell, and a second timer is started. Operation of the process remains in loop A until about nine seconds, when the five-second timer associated with ncell1 expires. At nine seconds, the test in step 560 becomes positive. Then, in step 670, the process determines that the best projected future C2 value, at a time T1, belongs to neighbor cell ncell2. As neighbor cell ncell2 still has an associated timer running, the process enters loop C, and iterates therein until 12 seconds have elapsed, at which point the second timer expires. At this point, step 670 determines that no other timers are running and that ncell2 has the best predicted future C2 value at a time T2, which is five seconds later, at 17 seconds. Accordingly, loop B is selected and step 680 initiates a reselection operation to ncell2 at around 12 seconds. In other words, the reselection operation is held-off for a further three seconds after a corresponding reselection operation of the first exemplary embodiment would have occurred.

Thus, according to the exemplary process of FIG. 6 and the data in the graph in FIG. 4, cell reselection occurs at around 12 seconds, to reselect from the current serving cell to the neighboring cell ncell2. This, again, avoids an undesirable cell reselection operation, to neighboring cell ncell1, which would otherwise occur.

There are a number of parameters in the foregoing process that can be varied to meet different requirements. For example, the number of historic C2 values that is used to plot trends can be increased or reduced, depending upon how sensitive the prediction needs to be to more recent C2 values. In addition, timers may be set to expire before or after five seconds, where a longer time could increase the accuracy of the prediction but risk delaying reselections for too long. Furthermore, the predicted C2 values might be predicted for before or after an additional five seconds, where a longer time would tend to be less accurate but a shorter time might lead to an increased number of unnecessary or undesirable reselection operations. All such parameters can be varied individually or collectively according to experimentation or system modeling.

Considering, for example, step 530 in more detail, one way of generating a trend is to take the stored, historic C2 values and construct a straight line of best fit for each neighbor cell, as illustrated in the graph in FIG. 4. Then, for each best fit line, the line is projected to a particular point in time in the future and used to predict a C2 value at the particular time. One way of predicting future C2 values will now be described using known linear regression techniques, thereby avoiding having to construct a graph as such.

If a set of data is expected to have a linear correlation, which is an assumption applied to the C2 data in the present exemplary embodiment over the period of time selected, then it is not necessary to plot actual data points on a graph in order to determine the constants m (slope) and b (y-intercept) of the straight line equation y=mx+b. Instead, a statistical treatment known as linear regression can be applied to a series of data points to determine these constants.

In particular, given a set of data $(x_i, y_i)$ with n data points, the slope m, y-intercept b and a correlation coefficient, r, can be determined using the following equations:

$$m = \frac{n \sum (xy) - \sum x \sum y}{n \sum (x^2) - (\sum x)^2} \quad \text{Equation 1}$$

$$b = \frac{\sum y - m \sum x}{n} \quad \text{Equation 2}$$

$$r = \frac{n \sum (xy) - \sum x \sum y}{\sqrt{[n \sum (x^2) - (\sum x)^2][n \sum (y^2) - (\sum y)^2]}} \quad \text{Equation 3}$$

It should be noted that the limits of the summation, which are i to n, and the summation indices on x and y have been omitted, for reasons of clarity only.

In the present example, the ten stored C2 values for each neighboring cell are treated as y values and the respective scan times are treated as x values, which are used in the foregoing equations to derive values of m and b for each neighboring cell. Then, the predicted C2 value, $y_T$, for each neighboring cell at a particular future time T1, is generated by substituting T1 as the value of x into the equation y=mx+b—where m and b are now known—and calculating the value of y. Thus, the predicted future value of C2 at time T1 for each neighboring cell can be generated, in order to facilitate a cell reselection to a neighbor cell that has the best predicted C2 value at a pre-determined future point in time.

It is anticipated that other techniques could be used to predict future C2 values, for example employing a weighted straight line fitting, where later C2 values are weighted to be more influential in the trend than earlier values, or even a curve fitting (such as logarithmic, exponential, power or polynomial) algorithm. Clearly such techniques would be more processor intensive on a mobile terminal, and it is expected that simple straight-line fitting would be appropriate for most situations.

Figure 7:
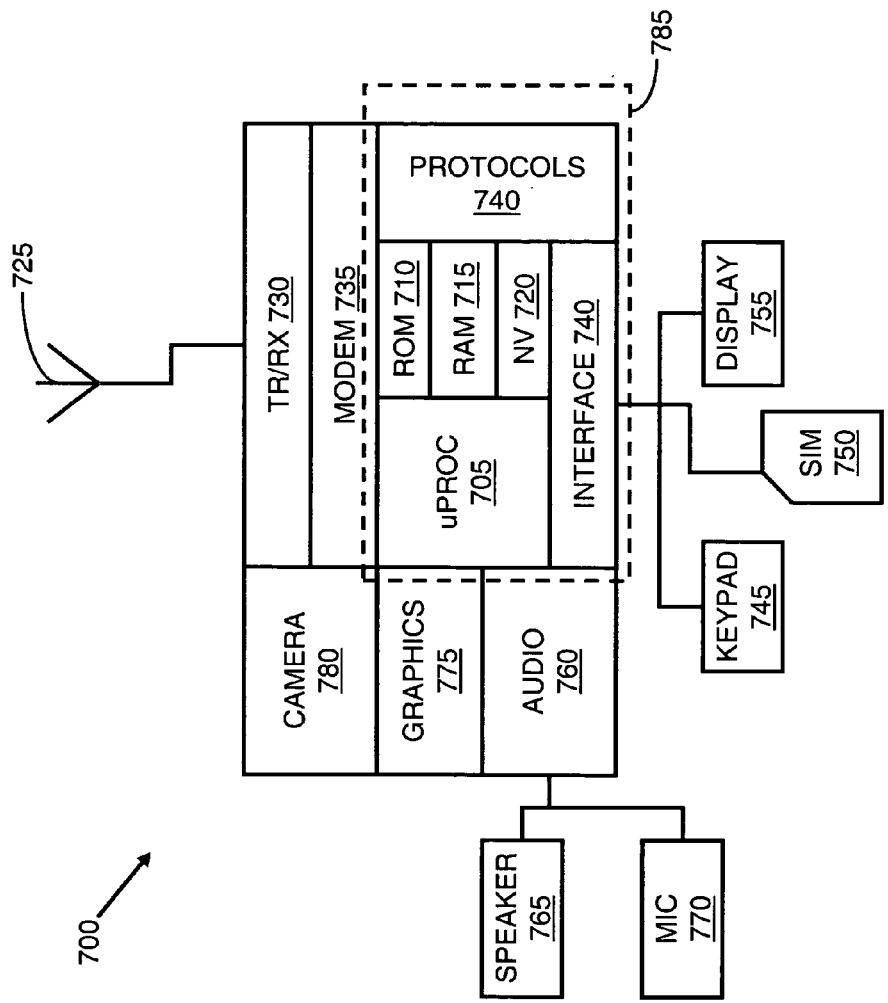
FIG. 7 is a block diagram showing the main functional components of a typical mobile station that may be configured to operate in accord with embodiments of the present invention.

The functional components of an exemplary mobile station 700 are illustrated in the block diagram in FIG. 7. The device in this example might be a mobile telephone handset. Embodiments of the present invention can be enacted by such a device. The device generally comprises an embedded processor 705, for controlling the overall operation of the device 700. The processor 705 has associated memory, including ROM 720, RAM 715 and non-volatile memory 720, for example for storing a control program of the device, application programs and/or an address book. Some or all of the memory might be separate from the processor. The device includes an antenna 725, which is connected to transmit/receive circuit 730, which communicates signals to and from the processor 705 via a modem 735. The device is arranged to interact with a base station according to several protocols, for example GSM, GPRS and/or 3G, which are supported by respective application programs, which are typically stored in a protocol module area 740 of non-volatile memory of the device. An interface module 740 facilitates communications with a keypad 745, a subscriber identity module (SIM) 750 and a display screen 755 of the device. An audio module 760 supports a speaker 765 and a microphone 770. A graphics processor 775 is included for processing graphics, for example for display on the display screen 755 and, in this example, the device includes a camera module 790.

A device of the kind shown in FIG. 7 is generally known in the prior art and it is typically an application program that needs to be arranged to control the device to operate in accord with embodiments of the present invention. For example, in embodiments of the present invention that operate in a GPRS cellular wireless communications system, a GPRS application program is arranged to operate generally in accord with one of the flow diagrams of FIG. 4 or FIG. 5, at least insofar as a cell reselection operation is concerned. In any event, at least a subset of the main components of the device in FIG. 7, as shown within the dotted line 785, may be provided as a single chip device, or as plural chips or components, which can be installed in a mobile station to operate according to embodiments of the present invention.

Having thus described the invention by reference to the embodiments shown in the drawings it is to be well understood that the embodiments in question are by way of example only and that modifications and variations such as will occur to those possessed of appropriate knowledge and skills may be made without departure from the spirit and scope of the invention as set forth in the appended claims and equivalents thereof.

The invention claimed is:

1. A cell reselection method for selecting a target cell in a cellular wireless communications system, comprising:

observing over time signal characteristics of cells, the cells including at least potential target cells;

observing a first indicator, which is indicative of the signaling level of a serving cell of the system, and observing second indicators, each one being indicative of a signaling level of one of the potential target cells;

starting a timer for any potential target cell having a second indicator that indicates the signaling level of the respective potential target cell is better than the signaling level of the serving cell as indicated by the first indicator;

determining that at least one timer has reached expiration;

predicting, upon the expiration of the at least one timer, an indicator value at a future time for any cell having a running or expired timer, wherein the predicting is based on the observing of the second indicators; and delaying a cell reselection to a target cell to a time later than the expiration of the at least one timer if any potential target cell having an unexpired running timer has a best predicted indicator value at the future time.

2. The method according to claim 1, further comprising determining that no timers are running for a first potential target cell having the best predicted value at the future time, and selecting the first potential target call as the target cell for reselection.

3. The method according to claim 2, wherein the signaling level of the selected target cell is predicted to be greater than the signaling level of the serving cell at the future time.

4. The method according to claim 2, wherein selecting the target cell further comprises selecting on the basis of the predicted future signaling level, even if the signaling level of that cell is worse than the signaling level of another potential target cell or a current serving cell at the time of making the selection.

5. The method according to claim 1, including storing plural historic values of observed characteristics for each potential target cell.

6. The method according to claim 5, wherein the predicting further comprises predicting which potential target cell is likely to provide the best signaling level in the future by using at least two stored historic values for each respective potential target cell.

7. The method according to claim 6, wherein the stored values for each potential target cell are used to generate a trend, which is projected into the future, in order to predict which potential target cell is likely to have the best signaling level.

8. The method according to claim 7, wherein the future signaling levels are predicted using the equation $y=mx+c$, where y represents a predicted signaling level at a time in the future, m represents the gradient of the trend line, x represents the point in the future, relative to a selected earlier reference time, and c represents a historic signaling level, which is determined by the trend line to be the signaling level at the selected reference time.

9. The method according to claim 1, wherein the cellular wireless communications network supports packet switched communications.

10. The method according to claim 9, wherein the cellular wireless communications network supports GPRS communications.

11. The method according to claim 1, wherein the signaling indicator is a C2 parameter.

12. The method according to claim 1, wherein the cellular wireless communications network supports circuit switched communications.

13. The method according to claim 12, wherein the cellular wireless communications network supports GSM communications.

14. The method according to claim 1, wherein a mobile station of the system initiates cell reselection.

15. The method according to claim 1, wherein a cellular wireless communications network of the system initiates cell reselection.

16. A cellular wireless communications system comprising plural cells, including a serving cell and plural potential target cells, and a mobile station operable according to the cellular wireless communications system, the system comprising:

a first process to observe over time signal characteristics of cells, the cells including at least potential target cells, wherein the first process is arranged to:

observe a first indicator, which is indicative of the signaling level of a serving cell of the system, and observing second indicators, each one being indicative of a signaling level of one of the potential target cells;

start a timer for any potential target cell having a second indicator that indicates the signaling level of the respective potential target cell is better than the signaling level of the serving cell as indicated by the first indicator;

determine that at least one timer has reached an expiration; and a second process to select a target cell by using the observed characteristics to predict which potential target cell will in future satisfy certain criteria, wherein the second process is arranged to:

predict, upon the expiration of the at least one timer, an indicator value at a future time for any cell having a running or expired timer, wherein the predicting is based on the observing of the second indicators; and delay a cell reselection to a target cell to a time later than the expiration of the at least one timer if any potential target cell having an unexpired running timer has a best predicted indicator value at the future time.

17. A cellular mobile communications apparatus adapted for operation in a cellular wireless communications system, the apparatus comprising:

a receiver arranged to receive cell signals, the signals having certain characteristics; and a processor arranged to operate processes for selecting a target cell, the processes comprising:

a first process to observe over time the signal characteristics of cells, the cells including at least potential target cells, wherein the first process is arranged to:

observe a first indicator, which is indicative of the signaling level of a serving cell of the system, and observing second indicators, each one being indicative of a signaling level of one of the potential target cells;

start a timer for any potential target cell having a second indicator that indicates the signaling level of the respective potential target cell is better than the signaling level of the serving cell as indicated by the first indicator;

determine that at least one timer has reached an expiration; and a second process to select a target cell by using the observed characteristics to predict which potential target cell will in future satisfy certain criteria, wherein the second process is arranged to:

predict, upon the expiration of the at least one timer, an indicator value at a future time for any cell having a running or expired timer, wherein the predicting is based on the observing of the second indicators; and delay a cell reselection to a target cell to a time later than the expiration of the at least one timer if any potential target cell having an unexpired running timer has a best predicted indicator value at the future time.

18. A programmed processing arrangement arranged to operate in accord with the method of claim 1.

19. A mobile communications apparatus arranged to operate in accord with the method of claim 1.

20. The cellular mobile communications apparatus according to claim 17, wherein the first process is further arranged to determine that no timers are running for a first potential target cell having the best predicted value at the future time, and wherein the second process is further arranged to select the first potential target call as the target cell for reselection.

21. The cellular mobile communications apparatus according to claim 20, wherein the signaling level of the selected target cell is greater than the signaling level of the serving cell at the future time.

22. The cellular mobile communications apparatus according to claim 20, wherein the second process is further arranged to select the target cell further based on the predicted future signaling level, even if the signaling level of that cell is worse than the signaling level of another potential target cell or a current serving cell at the time of making the selection.

23. The cellular mobile communications apparatus according to claim 17, wherein the first process is further arranged to store plural historic values of observed characteristics for each potential target cell.

24. The cellular mobile communications apparatus according to claim 23, wherein the second process is further arranged to predict which potential target cell is likely to provide the best signaling level in the future by using at least two stored historic values for each respective potential target cell.

25. The cellular mobile communications apparatus according to claim 24, wherein the second process is further arranged to use the stored values for each potential target cell to generate a trend, which is projected into the future, in order to predict which potential target cell is likely to have the best signaling level.

26. The cellular mobile communications apparatus according to claim 25, wherein the second process is further arranged to predict the future signaling levels using the equation $y=mx+c$, where y represents a predicted signaling level at a time in the future, m represents the gradient of the trend line, x represents the point in the future, relative to a selected earlier reference time, and c represents a historic signaling level, which is determined by the trend line to be the signaling level at the selected reference time.

27. At least one processor chip for selecting a target cell in a cellular wireless communications system, comprising:
   a first chip component for observing over time signal characteristics of cells, the cells including at least potential target cells;
   a second chip component for observing a first indicator, which is indicative of the signaling level of a serving cell of the system, and observing second indicators, each one being indicative of a signaling level of one of the potential target cells;
   a third chip component for starting a timer for any potential target cell having a second indicator that indicates the signaling level of the respective potential target cell is better than the signaling level of the serving cell as indicated by the first indicator;
   a fourth chip component for determining that at least one timer has reached expiration;
   a fifth chip component for predicting, upon the expiration of the at least one timer, an indicator value at a future time for any cell having a running or expired timer, wherein the predicting is based on the observing of the second indicators; and
   a sixth chip component for delaying a cell reselection to a target cell to a time later than the expiration of the at least one timer if any potential target cell having an unexpired running timer has a best predicted indicator value at the future time.

28. A computer readable medium encoded with instructions capable of being executed by a computer for selecting a target cell in a cellular wireless communications system, the instructions comprising:
   a first program portion operable to cause a computer to observe over time signal characteristics of cells, the cells including at least potential target cells;
   a second program portion operable to cause the computer to observe a first indicator, which is indicative of the signaling level of a serving cell of the system, and observing second indicators, each one being indicative of a signaling level of one of the potential target cells;
   a third program portion operable to cause the computer to start a timer for any potential target cell having a second indicator that indicates the signaling level of the respective potential target cell is better than the signaling level of the serving cell as indicated by the first indicator;
   a fourth program portion operable to cause the computer to determine that at least one timer has reached expiration;
   a fifth program portion operable to cause the computer to predict, upon the expiration of the at least one timer, an indicator value at a future time for any cell having a running or expired timer, wherein the predicting is based on the observing of the second indicators; and
   a sixth program portion operable to cause the computer to delay a cell reselection to a target cell to a time later than the expiration of the at least one timer if any potential target cell having an unexpired running timer has a best predicted indicator value at the future time.

29. A mobile communications apparatus for selecting a target cell in a cellular wireless communications system, comprising:
   means for observing over time signal characteristics of cells, the cells including at least potential target cells;
   means for observing a first indicator, which is indicative of the signaling level of a serving cell of the system, and observing second indicators, each one being indicative of a signaling level of one of the potential target cells;
   means for starting a timer for any potential target cell having a second indicator that indicates the signaling level of the respective potential target cell is better than the signaling level of the serving cell as indicated by the first indicator;
   means for determining that at least one timer has reached expiration;
   means for predicting, upon the expiration of the at least one timer, an indicator value at a future time for any cell having a running or expired timer, wherein the predicting is based on the observing of the second indicators; and
   means for delaying a cell reselection to a target cell to a time later than the expiration of the at least one tinier if any potential target cell having an unexpired running timer has a best predicted indicator value at the future time.

* * * * *